Feb. 5, 1952 — F. G. HODSDON — 2,584,206
MILK STRAINER
Filed April 7, 1949 — 2 SHEETS—SHEET 1
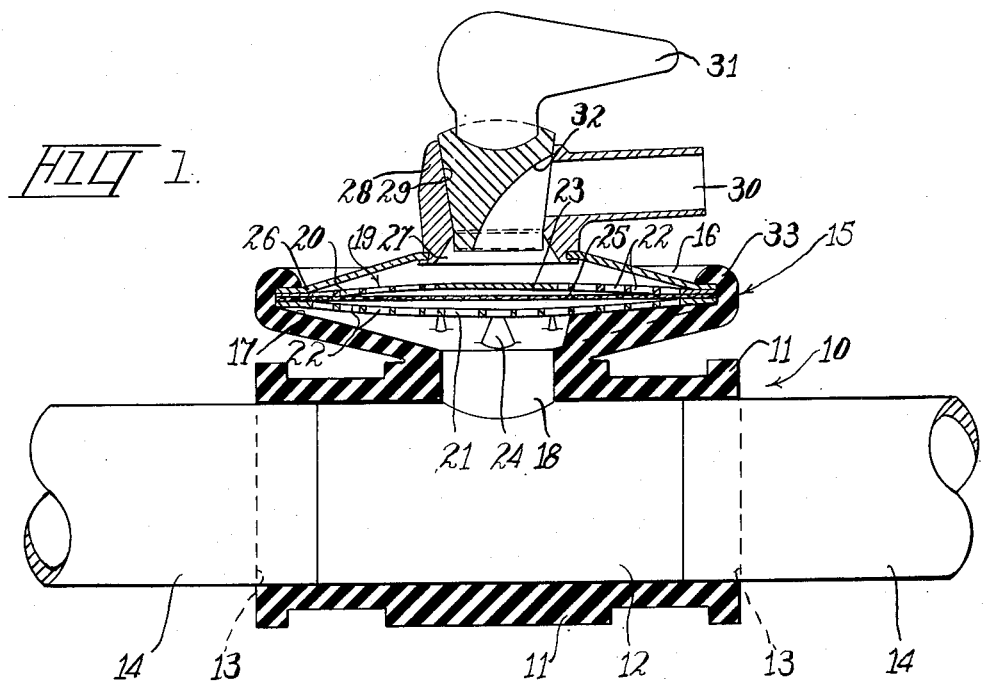
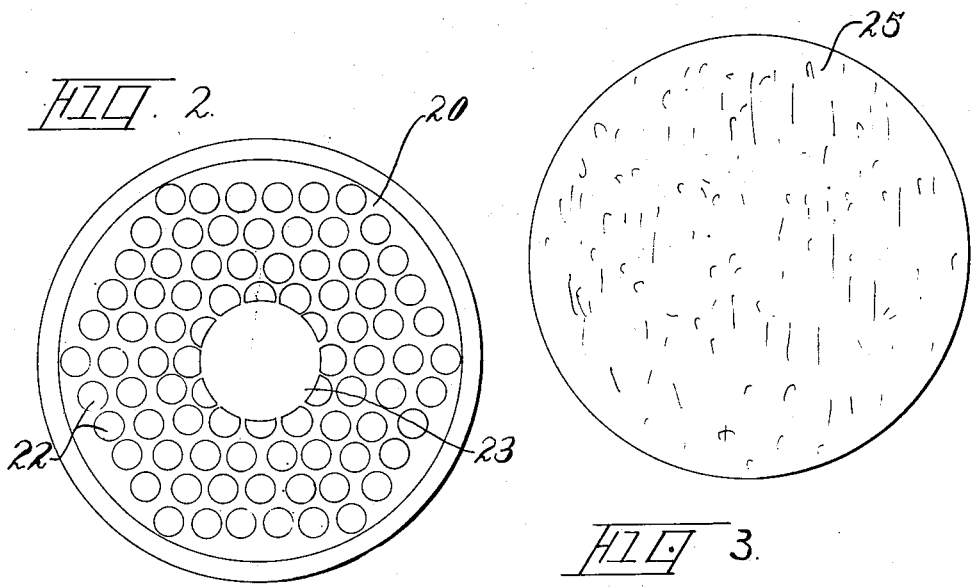
Inventor
Floyd G. Hodsdon Feb. 5, 1952　　　　F. G. HODSDON　　　　2,584,206
MILK STRAINER Filed April 7, 1949　　　　　　　　　　　2 SHEETS—SHEET 2

Inventor
Floyd G. Hodsdon
Paul O. Pippel
Atty

Patented Feb. 5, 1952

2,584,206

UNITED STATES PATENT OFFICE 2,584,206

MILK STRAINER

Floyd G. Hodsdon, Milwaukee, Wis., assignor to International Harvester Company, a corporation of New Jersey Application April 7, 1949, Serial No. 86,090

3 Claims. (Cl. 210—164)

This invention relates to a strainer assembly and more particularly to an improved strainer and filtering structure having novel features for facilitating the straining of fluids such as milk or the like.

In order to improve the quality of milk after it leaves the animal, it is desirable to strain out impurities such as dirt scale, or clotted milk formations, which find their way into the milk during the milking operation. In order to accomplish this operation, many different types of strainers have been developed. These previous strainers were generally found to be expensive both in manufacture and use. The initial expense would be high and the necessity of frequent change would require frequent stoppage of the complete milking operation.

In certain instances it is desirable to milk directly into a pipe line whereupon the milk is carried below atmospheric pressure to one or more containers for storage. The milk under pressure passes from the animal through a strainer and thereupon into the pipe line. In order to keep the bacteria and sediment count to a minimum it is desirable that the strainer be constructed so that it can readily be disassembled and cleaned after each use. The filtering structure usually includes a fibrous cloth which is adapted to filter fine particles suspended in the whole milk. It is desirable to replace the strainer cloth after each use so that the efficiency of the filter is maintained.

It is the prime object of applicant's invention to provide an improved inexpensive strainer structure especially adapted to strain fluids under pressure as they flow from each into the main milk pipe line.

Another object is to provide a strainer having novel features of construction which adapt the same to be readily assembled and disassembled after use so that the structure may be cleaned and the filtering element replaced.

A still further object is to provide a strainer structure having a funnel-shaped body of resilient rubber-like material which is integrally formed with a pipe line connection.

Another object is to provide a strainer structure including a funnel-shaped rubber member having a resilient rubber flange adapted to hold a filtering structure in assembly, the flange being easily manually distorted for permitting the insertion and removal of the filtering element.

A still further object is to provide an improved filtering structure adapted to readily filter fluids entering the structure below atmospheric pressure.

These and other objects will become more readily apparent from a reading of the specification when examined in connection with the accompanying drawings.

In the drawings:

Fig. 1 is a cross-sectional view through an improved strainer and filtering structure.

Fig. 2 is a detail plan view of a filtering disk.

Fig. 3 is a detail plan view of a fibrous filtering disk.

Figure 5:
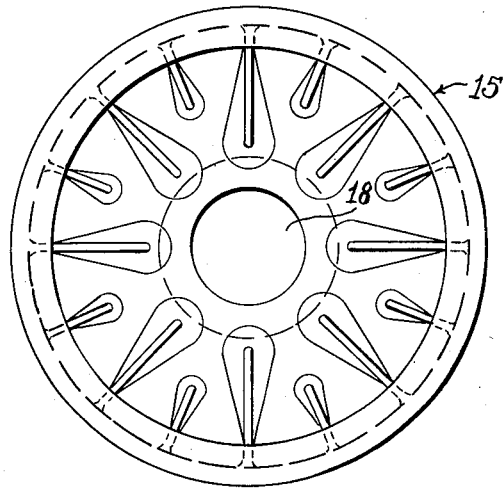
Fig. 5 is a plan view of the same.
Figure 4:
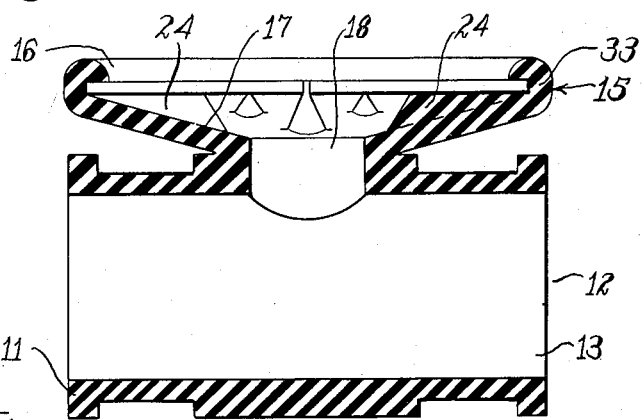
Fig. 4 is a sectional view through a funnel-shaped filtering member.

Referring particularly to Figs. 1 and 4, a strainer assembly is generally designated by the reference character 10. The strainer assembly 10 includes a longitudinally extending conduit formed of a rubber-like material. The conduit 11 includes a chamber 12, the chamber 12 being connected with openings 13 provided at the ends of the conduit 11. A funnel-shaped body member 15 is integrally formed and connected to the longitudinally extending conduit 11. The body member 15 is also formed of a rubber-like material. It can, of course, be appreciated that this type of structure can readily be molded with the use of resilient materials such as plastics or other synthetics. The funnel-shaped body member 15 is provided with an opening 16 at its upper end. A conical inner surface 17 is provided on the funnel-shaped body member 15 and this surface 17 tapers toward an opening 18 which is in communication with the chamber 12.

A filtering structure is generally designated by the reference character 19. The filtering structure 19 consists respectively of upper and lower filtering or strainer disks 20 and 21 preferably made of a metal material. The strainer disks 20 and 21 include a plurality of perforations 22. The filtering element 20 is provided with an imperforate portion 23. A plurality of rubber projections or supporting lugs 24 are provided in the conical inner surface 17 of the member 15. The lugs 24 project radially outwardly from the axes of the member 15 and are circumferentially spaced with respect to each other. The lugs project in an axial direction from the conical inner surface 17.

The filtering structure 19 is supported on the rubber projections or supporting lugs 24 and a filtering pad or disk 25 is positioned and clamped between the filtering disks 20 and 21. The disks 20 and 21 are of concavo-convex shape, the maximum spacing of the disks 20 and 21 taking splace near the axis of the disks. The filtering pad or disk 25 may be of any fibrous material such as cloth or paper adapted to strain fine particles from a fluid.

A covering disk 26 is positioned over the disks 20 and 21. The covering disk 26 is of conical shape and has its outer annular edge seated upon the edges of the filtering disks 20 and 21. The covering disk is provided with an opening 27 which is in axial alignment with the opening 18 and with the imperforate section 23 of the disk 20. A boss 28 projects from the covering disk 26, the boss being provided with a bore 29. The bore 29 may be placed in communication with a fluid connection 30 by means of a pet-cock 31 having a conventional type of recess construction 32. The funnel-shaped body member 15 is provided with an inwardly extending annular flange 33. The flange 33 is arranged to resiliently engage and clamp the edges of the covering member 26 against the strainer disks 20 and 21. The filtering structure 19 is therefore resiliently pressed against the rubber projections 24 and thus the filtering structure is secured in assembly with the funnel-shaped member 15.

Figure 6:
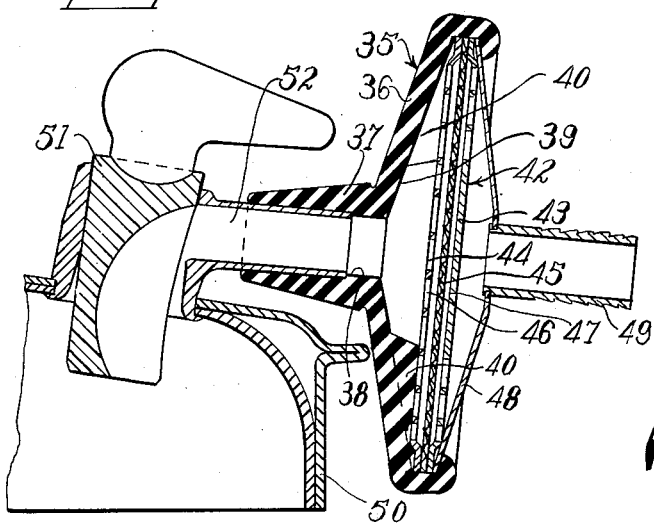
Fig. 6 is a sectional view through a modified form of strainer structure connected to a conventional type milker pail cover.

A modified strainer assembly 35 is shown in Fig. 6. The assembly 35 includes a funnel-shaped body member 36 having a projection 37 which is provided with a bore 38. The funnel-shaped body member is formed of a rubber-like material having great qualities of resiliency. The body member 36 includes an inner tapering conical surface 39 provided with a plurality of integral rubber projections 40 adapted to support a filtering structure 42. The filtering structure 42 includes a pair of spaced disks 43 and 44 between which is positioned a filtering cloth or disk 45. The disks 43 and 44 are provided with a plurality of perforations 46, the disk 43 having a centrally located imperforated portion 47, the purpose of which will presently become apparent. A covering disk 48 is positioned to enclose the filtering structure 42 within the funnel-shaped member 36. The covering disk 48 includes an inlet connection 49. The strainer assembly 35 is connected as shown in Fig. 6 to a milk can cover 50 which is adapted to act as a closure for a conventional type of milk can. The milk can cover 50 is provided with a milk cock 51 having the usual type of inlet connection 52. The connection 52 frictionally engages the boss 37 to place the can cover 50 in communication with the filtering structure.

The strainer assembly shown in Fig. 1 is used in connection with a pipe line milking operation wherein the whole milk under pressure enters through the fluid connection 30 into the funnel-shaped body member 15. The imperforate portion 23 of the filtering disk 20 is adapted to deflect the milk under pressure to the sides of the disks 20 and 21 whereupon it is strained through the filtering cloth 25 and passes into the chamber 12. It is especially important to note that the imperforate portion 23 of the disk 20 serves to deflect the milk under pressure and therefore the outer area of the upper filtering disk 25 is utilized. The velocity of the liquid having been stopped or deflected by the non-perforated center part can then flow through the outer holes and under the center part and utilize the entire filter pad for straining. The imperforate portion 23 also prevents the possibility of damaging or puncturing the center portion of the cloth disk which might readily occur due to the high velocity of the milk flow during the operation. The strainer 10 may readily be disconnected from the conduits 14 by simply pulling out the conduits from the longitudinally extending conduit 11. The parts are held in assembly by means of the resiliency exerted by the rubber conduit 11 and the higher atmospheric pressure outside the filter. When it is desired to wash the strainer assembly 10 the operator simply manually distorts the inwardly extending flange 33 and thus expediently withdraws the flange from engagement with the covering member 26 and the filtering structure 19. Thus the disks 22 can be snapped out of assembly and the filtering cloth can readily be replaced with a minimum of effort and time on the part of the operator.

The operation of the modified form of the invention shown in Fig. 6 is similar to that above described. In this construction the disk 43 is also provided with an imperforate portion 47 which functions in a similar manner to the operation of the disk 20 above described. The filtering structure in this case is attached to the milk pail cover 50. The filtering cloth 45 may also be readily replaced by simply distorting or expanding the inwardly extending annular edge or rubber-like material which normally holds the filtering structure in assembly.

It should now be obvious that applicant has provided an improved novel and inexpensive filtering structure which permits the ready and quick replacement of the filtering elements for replacement or washing purposes. The novel utilization of a funnel-shaped body member having a resilient inwardly extending edge arranged to clamp the filtering elements together permits the efficient filtering of fluids under pressure below atmospheric, securely sealing the structure during this operation and at the same time permitting ready and quick replacement of the parts after the operation has ended and the inside below atmospheric pressure has been relieved. It can thus be seen that the objects of the invention have been fully met and it must be understood that changes and modifications may be made which do not depart from the spirit of the invention as disclosed nor the scope thereof as defined in the appended claims.

What is claimed is:

1. A strainer assembly comprising a longitudinal body structure having a chamber, said body structure being formed of a rubber-like material and including inlet and outlet openings, said body being adapted to frictionally engage in sealing relation conduits in communication with the outlet openings of said body, a funnel-shaped inlet member of rubber-like material integrally formed with said rubber-like body, said inlet member having an opening communicating with the chamber, a plurality of resilient supporting lugs extending upwardly within the funnel-shaped member, a filtering structure carried by said funnel-shaped member, said structure including upper and lower concavo-convex disks, each disk being provided with a plurality of spaced perforations, an annular strainer disk positioned between said concavo-convex disks, a covering disk positioned over said filtering structure, said disk having a fluid inlet opening, and an annular inwardly extending flange on said funnel-shaped member, said flange being formed of a rubber-like material and being arranged and constructed to engage the edge of said covering disk for resiliently securing the filtering structure and the funnel-shaped member in assembly, said flange being expansible out of engagement with the covering disk whereby the filtering structure may be removed from the strainer assembly.

2. A strainer assembly comprising a longitudinal body structure having a chamber, said body structure being formed of a rubber-like material and including inlet and outlet openings, a funnel-shaped inlet member of rubber-like material integrally formed with said rubber-like body, said inlet member having an opening communicating with the chamber, a plurality of resilient supporting lugs extending upwardly within the funnel-shaped member, a filtering structure carried by said funnel-shaped member, said structure including upper and lower disks, each disk being provided with a plurality of spaced perforations, a strainer cloth positioned between said disks, a covering disk positioned over said filtering structure, said disk having a fluid opening, and an annular inwardly extending flange on said funnel-shaped member, said flange being formed of a rubber-like material and being arranged and constructed to engage the edge of said covering disk for resiliently securing the filtering structure and the funnel-shaped member in assembly, said flange being expansible out of engagement with the covering disk whereby the filtering structure may be removed from the strainer assembly.

3. A strainer assembly comprising a funnel shaped member of rubber-like material, said funnel shaped member including an inner conical surface tapering toward an opening formed in the funnel shaped member, a conduit projecting outwardly from the funnel shaped member, said conduit being also formed of rubber-like material, integral with the funnel shaped member and in communication with the opening, a plurality of resilient supporting lugs connected to the inner conical surface and projecting axially with respect thereto, said supporting lugs extending radially outwardly from the axis of the funnel shaped member and being circumferentially spaced with respect to each other, an annular flange of rubber-like material integral with said funnel shaped member, said flange being disposed at the larger end of the funnel shaped member and extending inwardly toward the axis of the funnel shaped member, a filtering structure supported on said supporting lugs, said filtering structure including a perforated disk supported transversely on said lugs, a cover member for enclosing the funnel shaped member, said cover member having a centrally disposed opening, a conduit connection on said cover member projecting outwardly therefrom, said flange resiliently engaging the peripheral edge of said covering member whereby the covering member, the filtering structure and the funnel shaped member are resiliently clamped in assembled relation.

FLOYD G. HODSDON.

REFERENCES CITED

The following references are of record in the file of this patent:

UNITED STATES PATENTS

| Number | Name | Date |
|---|---|---|
| 434,117 | Rickets | Aug. 12, 1890 |
| 435,096 | Hoops | Aug. 26, 1890 |
| 1,009,098 | Ratican | Nov. 21, 1911 |
| 1,047,070 | Kantrowitz | Dec. 10, 1912 |
| 1,403,108 | Postma | Jan. 10, 1922 |
| 1,888,245 | Sperling | Nov. 22, 1932 |
| 2,073,991 | Koser | Mar. 16, 1937 |
| 2,100,165 | Holmberg et al. | Nov. 23, 1937 |
| 2,314,357 | Lehman | Mar. 23, 1943 |
| 2,321,220 | Lieberman | June 8, 1943 |

FOREIGN PATENTS

| Number | Country | Date |
|---|---|---|
| 428,554 | Great Britain | May 15, 1935 |